(No Model.)
M. H. WALLACE.
AXLE LUBRICATOR.
No. 363,924. Patented May 31, 1887.
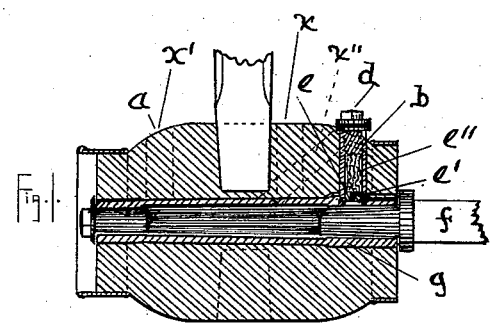
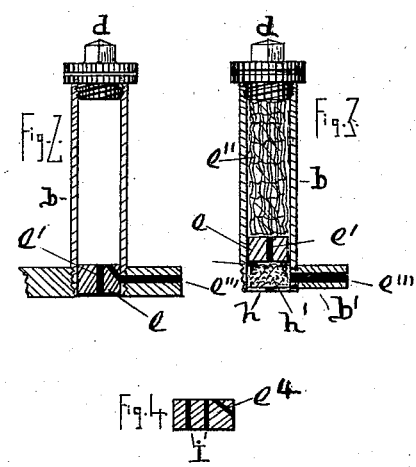
Samuel J. Parker.
Luther L. Johnson.
Witnesses.
Morris H. Wallace.
Inventor.
N. PETERS, Photo-Lithographer, Washington, D. C.

UNITED STATES PATENT OFFICE.

MORRIS H. WALLACE, OF WEST DRYDEN, NEW YORK.

AXLE-LUBRICATOR.

SPECIFICATION forming part of Letters Patent No. 363,924, dated May 31, 1887.

Application filed January 29, 1887. Serial No. 225,943. (No model.)

*To all whom it may concern:*

Be it known that I, MORRIS H. WALLACE, a citizen of the United States, residing at West Dryden, in the town of Dryden, Tompkins county, New York, have invented an Improved Oil Tube and Reservoir for Wagon-Hubs, of which the following is a specification, reference being had to the accompanying drawings.

My invention relates to an oil-reservoir in the hub of a wagon-wheel; and the nature of my invention will be apparent as I describe it.

Figure 1 is a sectional elevation of a wagon-wheel hub with my structure in it. Fig. 2 is a detached sectional enlarged view of the tubular reservoir. Fig. 3 is another form of my structure with two openings for the oiling, and Fig. 4 is a detached valve with the three openings.

In the figures, $a$ is the hub, with the tubular reservoir $b$ in its shoulder end, and $g$ is the iron box of the hub, and $d$ is the screw stopper or plug that closes the top of the structure, and near the axle $f$ is a sole-leather partition or diaphragm, $e$, which has one or more apertures or holes in it, through which the oil escapes upon the axle by slow degrees. The aperture or apertures in the sole-leather partition may be of any size, but should be as small as consistently possible, that the oil may escape by degrees. Above the diaphragm a retaining article, $e''$, such as cotton-batting, candle-wicking, or sponge, is placed in the reservoir to retard the flow of the oil out on the axle. By the leather partition or diaphragm and the retarding substance I make a slow feeding of the oil, as well as retain the oil in the tube when the wheel is taken off of the axle to clean and examine the axle.

The stopper $d$ may be made in any shape; but I prefer it with a square projecting top, turned by a key or a wrench, so that it can be turned firmly in, and to have a leather washer under its shoulder.

I place, preferably, my tubular reservoir in the shoulder end of the hub, as shown in Fig. 1; but it can be put in next to the spokes, as at $x$, Fig. 1, (indicated by dotted lines,) or at the outside end, as at $x'$, Fig. 1, or obliquely, as indicated by the dotted lines $x''$. I also make, when desirable so to do in large wagons, two openings for the oil to reach the axle—one, as already described, upon the axle itself, and the other, $e''''$, to reach the shoulder of the axle. This additional hole I prefer to be made as indicated in Fig. 3, where $e'$ is the axle-aperture and $e'''$ is the shoulder-aperture made in the axle-box; but a short tube may be used above and independent of the axle-box on the same principles.

The leather partition or diaphragm in wagons with nicely-fitted axles and boxes will run much longer and better if the diaphragm $e$ is slotted at $h$ and a piece of sponge is put in the hollow space between the leather diaphragm and the axle. In the same style of nicely-fitted axles, if the sponge is omitted, two holes, $i$, Fig. 4, made through the diaphragm $e$ to the axle, and an inclined hole leading to the aperture through the box, as in Fig. 3, serve a useful purpose, and thus I make a useful tubular oil-reservoir that delivers the oil surely to the axle and its shoulder, which is not difficult to be made and can be applied to any wagon. In case the box $g$ is bored to make the passage for the oil to the axle-shoulder, the valve $e$ can go down to and rest on the axle, as when the passage or tube $e'''$ is not made. A thumb-screw cap can be made in place of the wrench-turned plug, it being held from loosening by a spring-snap. Coarse sand or asbestus may be used as oil-retaining material in the reservoir.

What I consider novel is as claimed.

I claim—

1. A diaphragm or partition, $e$, placed in the reservoir $b$, provided with the material $e''$ above it, and with the sponge $h'$ between it and the axle, as set forth.

2. The divided escape-orifices $e'\,e'''$, one opening to the axle and the other to the shoulder, as set forth.

MORRIS H. WALLACE.

Witnesses:
SAMUEL J. PARKER,
LUTHER S. JOHNSON.